United States Patent [19]

Gallagher

[11] Patent Number: 4,550,156
[45] Date of Patent: Oct. 29, 1985

[54] POLYETHERIMIDE COPOLYMERS

[75] Inventor: Patrick E. Gallagher, Pittsfield, Mass.

[73] Assignee: General Electric Company, Pittsfield, Mass.

[21] Appl. No.: 665,048

[22] Filed: Oct. 26, 1984

[51] Int. Cl.$^4$ .............................................. C08G 73/10
[52] U.S. Cl. .................................... 528/185; 528/125; 528/126; 528/128; 528/172; 528/208; 528/352; 528/353
[58] Field of Search ............... 528/125, 126, 128, 172, 528/185, 208, 352, 353

[56] References Cited

U.S. PATENT DOCUMENTS

| | | | |
|---|---|---|---|
| 3,847,867 | 11/1974 | Heath et al. | 528/185 |
| 3,847,869 | 11/1974 | Williams | 528/185 |
| 3,850,885 | 11/1974 | Takekoshi et al. | 528/185 |
| 3,852,242 | 12/1974 | White | 528/185 |
| 3,855,178 | 12/1974 | White et al. | 528/185 |
| 3,972,902 | 8/1976 | Heath et al. | 528/185 |
| 3,983,093 | 9/1976 | Williams et al. | 528/185 |
| 4,417,044 | 11/1983 | Parekh | 528/185 |
| 4,429,102 | 1/1984 | Evans et al. | 528/185 |

*Primary Examiner*—Lester L. Lee
*Attorney, Agent, or Firm*—Bernard, Rothwell & Brown

[57] ABSTRACT

This invention is concerned with a new class of polyetherimide copolymers. More particularly, the invention is concerned with polyetherimide copolymers containing polyetherimide repeating units and repeating polyimide units. The polyetherimide compositions have improved solvent resistance and good heat properties.

6 Claims, No Drawings

POLYETHERIMIDE COPOLYMERS

This invention relates to novel polyetherimide polymers. More particularly, the invention concerns polyetherimide polymers which exhibit superior resistance to heat and chemical solvents.

Polyetherimides are unique polymers which have advantageous physical and chemical properties, including high heat resistance, exceptional strength and excellent processability. These polymers can be used as wire coatings and are particularly suited for injection molding and extrusion applications. Polyetherimides are conventionally made by reacting an aromatic bis (ether anhydride) with an organic diamine.

Various means have been employed to improve the physical and chemical properties of polyetherimides even further. For example blends or copolymers of polyetherimides with other polymers or additives have been disclosed for improving impact strengths, heat distortion temperatures and the like. Williams, F.J. et al., disclose in U.S. Pat. No. 3,983,093 copolymers of polyetherimides and certain polyimides described as having resistance to chemical solvents. Although the copolymers described by Williams, et al., have improved chemical solvent resistance, articles made from those polymers are nevertheless subject to crazing and cracking in the presence of such solvents or their vapors. It has been found that the incorporation of polyimides into the polyetherimide backbone has the added benefit of substantially improving the heat resistance of the resulting copolymers. A need exists for means for further enhancing the chemical solvent resistance of polyetherimide-polyimide copolymers, while maintaining the excellent heat resistance of such copolymers.

SUMMARY OF THE INVENTION

In accordance with the present invention, a polyetherimide copolymer comprises repeating polyimide units of the formula $$-N\underset{\underset{O}{\overset{\|}{C}}}{\overset{\overset{O}{\|}}{\underset{}{C}}}\diagdown M\diagup\underset{\underset{O}{\overset{\|}{C}}}{\overset{\overset{O}{\|}}{\underset{}{C}}}N-R_1-$$

and repeating polyethermide units of the formula $$-N\overset{\overset{O}{\|}}{\underset{\underset{O}{\overset{\|}{C}}}{C}}\diagdown\!\!\!\bigcirc\!\!\!-O-Z-O-\!\!\!\bigcirc\!\!\!\diagup\overset{\overset{O}{\|}}{\underset{\underset{O}{\overset{\|}{C}}}{C}}O-R_1-$$

wherein $R_1$ is selected from the group represented by the following formulas:

I $-\bigcirc-$ ,

II $-\bigcirc-$ ,
  $\ |$
  $R_2$

III $-\bigcirc\!\!\!-\!\!\!\bigcirc-$ ,

IV $-\bigcirc-$ ,
(with methyl)

V $-\bigcirc-$ ,
  $\ |$
  $R_2$

VI $-\bigcirc-\underset{\underset{O}{\overset{\|}{S}}}{\overset{\overset{O}{\|}}{}}-\bigcirc-$ ,

VII $-\bigcirc-\underset{H}{\overset{H}{\underset{|}{\overset{|}{C}}}}-\bigcirc-$ where $R_2$ is an alkyl radical having form 1 to 4 carbon atoms, provided that from about 1% to about 99% of the $R_1$ groups of the copolymer are of the formulas I–III and from about 99% to about 1% of the $R_1$ groups of the copolymer are of the formulas IV–VII; and M and Z are as hereinafter defined.

DETAILED DESCRIPTION OF THE INVENTION

It has been found that the resistance of polyetherimide-polyimide copolymers to crazing and cracking in the presence of chemical solvents can be improved by using a mixture of certain diamines to prepare the copolymer. It has further been found that the copolymers of this invention maintain the excellent heat resistance associated with polyetherimide-polyimide copolymers.

The copolymers of the present invention advantageously contain at least about 25 mole % of the polyetherimide repeating units, preferably at least 50 mole %, most preferably at least about 75 mole % of such units, up to about 99 mole %, with the balance composed of the polyimide repeating units.

The polyetherimide repeating units are represented by the formula $$-N\overset{\overset{O}{\|}}{\underset{\underset{O}{\overset{\|}{C}}}{C}}\diagdown\!\!\!\bigcirc\!\!\!-O-Z-O-\!\!\!\bigcirc\!\!\!\diagup\overset{\overset{O}{\|}}{\underset{\underset{O}{\overset{\|}{C}}}{C}}N-R_1-$$

where $R_1$ is as previously described and —O—Z—O— may be in the 3 or 3'-and 4 or 4'-positions and Z is a member of the class consisting of (1)

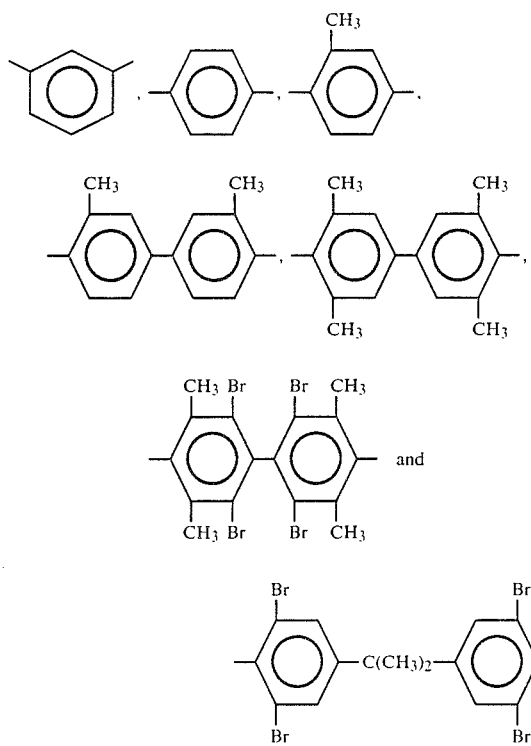

and (2) divalent organic radicals of the general formula:

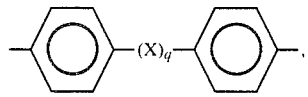

where X is a member selected from the class consisting of divalent radicals of the formulas, $-C_yH_{2y}-$,

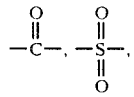

—O— and —S—, where q is 0 or 1, y is a whole number from 1 to 5.

The polyimide repeating units are represented by the formula

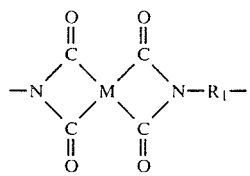

where M is selected from the group consisting of

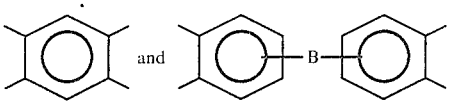

wherein B is —S— or

and $R_1$ is as previously described. The copolymers generally contain from about 10 to 10,000 or more of the polyetherimide and polyimide repeating units. Generally useful high molecular weight copolymers have an intrinsic viscosity ($\eta$) in chloroform greater than 0.2 dl/gm, preferably in the 0.4 to 0.7 dl/gm range or higher in m-cresol at 25° C.

It had been found that the chemical resistance of polyetherimide-polyimide copolymers is improved by employing a mixture of organic diamines in the synthesis of the polymers. In general, it has been found that organic diamine residues having relatively rigid linear structures, such as those of formulas I, II and III above, impart a crystalline structure to the resulting polymer, thus enhancing heat and solvent resistances. On the other hand, to maintain reasonable flexibility and glass transition temperatures, relatively non-linear, flexible organic diamine residues, such as those of formulas IV, V, VI and VII above, are also incorporated into the polymers. Accordingly from about 1% to about 99% preferably from about 25% to about 75% of the total groups represented by $R_1$ in the above formulas are formulas I-III and the remaining groups represented by $R_1$ are of the formulas IV–VII.

In general, the copolymers of this invention are prepared by reacting a mixture of at least two diamines with a mixture of dianhydrides of the formula

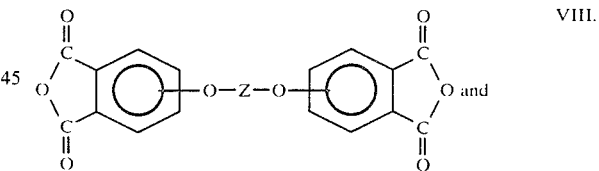 VIII.

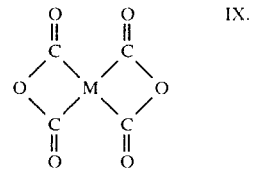 IX.

wherein Z and M are as hereinbefore defined. Dianhydrides of formula VIII are described, for example, in U.S. Pat. Nos. 3,847,867 (Heath, et al.), 3,847,869 (Williams), 3,850,885 (Takekoshi, et al.), 3,852,242, 3,855,178 (White) and 3,972,902 (Heath, et al), each of which is incorporated herein by reference. Additional such dianhydrides are shown by Koton, M.M., et al., (Institute of Heterooganic Compounds, Academy of Sciences, U.S.S.R.), U.S.S.R. No. 257,010, Nov. 11, 1969, Appl. May 3, 1967. In addition, dianhydrides are shown by M.M Koton, et al., *Zh. Org. Khin.*, 4(5), 774 (1968).

Dianhydrides of formula IX are described in U.S. Pat. No. 3,983,093 (Williams, et al.) incorporated herein by reference.

The reaction of the organic dianhydrides and the diamino compounds advantageously can be carried out by employing well-known solvents, e.g., o-dichlorobenzene, m-cresol/toluene, etc., in which to effect interaction between the dianhydrides and the diamines, at temperatures of from about 100° to about 250° C. Alternatively, the polyetherimides can be prepared by melt polymerization where the dianhydrides are reacted with the diamines while heating the mixture of ingredients at elevated temperatures with concurrent intermixing. Generally, melt polymerization temperatures between about 200° to 400° C. and preferably 270° to 350° C. can be employed. Any order of addition of chain stoppers ordinarily employed in melt polymerization can be employed. The conditions of the reaction and proportions of ingredients can be varied widely depending on the desired molecular weight, intrinsic viscosity, and solvent resistance. In general, equimolar amounts of diamine and dianhydride are employed for high molecular weight polyetherimides. The polyetherimides are injection moldable and can be reinforced by fillers, such as silica, carbon, fibers, glass fibers, etc., in which the filler comprises on a weight basis from 20 to 200 parts of filler per 100 parts of polymer.

The following examples illustrate but do not limit a person skilled in the art the preparation of polyetherimides according to this invention.

EXAMPLE I

To a 5 liter, jacketed (heating mantle) vessel were charged 900 g of 2,2-bis[4-(3,4-dicarboxyphenoxy)-phenyl]propane dianhydride (BPA-DA), 141.61 g of m-phenylenediamine (m-PD), 84.97 g of p-phenylenediamine (p-PD), 19.86 g of phthalic anhydride, 150 ppm of sodium phenyl phosphinate as a catalyst, and 2831 g o-dichlorobenzene. The temperature was raised to 130° C. and held for one hour. A charge of 66.76 g of pyromellitic dianhydride was slowly added to maintain the temperature of the mixture above 125° C. The temperature was raised to 160° C. and held there for one hour. The low polymer solution was then tranferred to the helicone for devolatilization at 290° C. and 22 mm Hg for two hours. The resulting 1.9 pounds of tetrapolymer had an intrinsic viscosity of 0.72 dl/g in 60:40 phenol:tetrachloroethane, a glass transition temperature of 236° C., a heat deflection temperature of 214° C. and a melt index of 0.68 (371° C.). In the Environmental Stress Crack Resistance (ESCR) test, the tetra polymer showed no cracking or crazing in 1,1,1-trichloroethane (hereinafter referred to as "TCE") at 4,000 psi after 336 hours and in transformer oil (120° C.) the material showed no cracking or crazing at 3,200 psi after 336 hours.

EXAMPLE 2

To a 500 ml, jacketed (heating mantle) vessel were charged 90.0 g of 2,2-bis[4-(3,4-dicarboxyphenoxy)-phenyl]propane dianhydride (BPA-DA), 10.7 g of m-phenylenediamine (m-PD), 10.7 g of p-phenylenediamine (p-PD), 1.9 g of phthalic anhydride, 150 ppm of sodium phenyl phosphinate and 274g of o-dichlorobenzene. The temperature was raised to 130° C. and held at that temperature for 1 hour. A chargeof 4.2 g of pyromellitic dianhydride was added slowly and the temperature was then raised to 160° C. and held there for one hour. A sample of the material was devolatilized at 320° C. and 25 mm Hg for 2 hours. The resulting polymer was insoluble in chloroform but dissolved in 60:40 phenol:tetrachloroethane and had an intrinsic viscosity of 0.79 dl/g.

EXAMPLE 3

To a 500 ml, jacketed (heating mantle) vessel were charged 90.0 g of 2,2-bis[4-(3,4dicarboxyphenoxy)-phenyl]propane dianhydride (BPA-DA), 16.1 g of m-phenylenediamine (m-PD), 5.4 g of p-phenylenediamine (p-PD), 1.9 g of phthalic anhydride, 150 ppm of sodium phenyl phosphinate and 274 g of o-dichlorobenzene. The temperature was raised to 136° C. and held at that temperature for 1 hour. A charge of 4.2 g of pyromellitic dianhydride was added slowly and the temperature was then raised to 160° C. and held there for 1 hour. A sample of the material was devolatilized at 320° C. and 25 mm Hg for 2 hours. The resulting polymer was insoluble in chloroform but dissolved in 60:40 phenol:tetrachloroethane and had an intrinsic viscosity of 0.64 dl/g.

EXAMPLE 4

To a 500 ml, jacketed (heating mantle) vessel were charged 90.0 g of 2,2-bis[4-(3,4-dicarboxyphenoxy)-phenyl]propane dianhydride (BPA-DA), 17.0 g of m-phenylenediamine (m-PD), 5.7 g of p-phenylenediamine (p-PD), 2.0 g of phthalic anhydride, 150 ppm of sodium phenyl phosphinate and 282 g of o-dichlorobenzene. The temperature was raised to 134° C. and held at that temperature for 1 hour. A charge of 6.7 g of pyromellitic dianhydride was added slowly and the temperature was then raised to 160° C. and held there for 1 hour. A sample of the material was devolatilized at 320° C. and 25 mm Hg for 2 hours. The resulting polymer was insoluble in chloroform but dissolved in 60:40 phenol:tetrachloroethane and had an intrinsic viscosity of 0.61 dl/g.

EXAMPLE 5

To a 500 ml, jacketed (heating mantle) vessel were charged 90.0 g of 2,2-bis[4-(3,4-dicarboxyphenoxy)-phenyl]propane dianhydride (BPA-DA), 10.1 g of m-phenylenediamine (m-PD), 10.1 g of p-phenylenediamine (p-PD), 1.8 g of phthalic anhydride, 150 ppm of sodium phenyl phosphinate and 266 g of o-dichlorobenzene. The temperature was raised to 134° C. and held at that temperature for 1 hour. A charge of 2.0 g of pyromellitic dianhydride was added slowly and the temperature was then raised to 160° C. and held there for 1 hour. A sample of the material was devolatilized at 320° C. and 25 mm Hg for 2 hours. The resulting polymer was insoluble in chloroform but dissolved in 60:40 phenol:tetrachloroethane and had an intrinsic viscosity of 0.76 dl/g.

EXAMPLE 6

To a 500 ml, jacketed (heating mantle) vessel were charged 90.0 g of 2,2-bis[4-(3,4-dicarboxyphenoxy)-phenyl]propane dianhydride (BPA-DA), 12.0 g of m-phenylenediamine (m-PD), 9.4 g of p-phenylenediamine (p-PD), 2.0 g of phthalic anhydride, 150 ppm of sodium phenyl phosphinate and 274 g of o-dichlorobenzene. The temperature was raised to 133° C. and held at that temperture for 1 hour. A charge of 6.7 g of pyromellitic dianhydride was added slowly and the temperature was then raised to 170° C. and held there for 1 hour. A sample of the material was devolatilized at 320° C. and 25 mm Hg for 2 hours. The resulting polymer was insoluble in chloroform but dissolved in 60:40 phenol:tetrachloroethane and had an intrinsic viscosity of 0.73 dl/g.

EXAMPLE 7

To a 5 liter, jacketed (heating mantle) vessel were charged 900.0 g 2,2-bis[4-(3,4-dicarboxyphenoxy)phenyl]propane dianhydride (BPA-DA), 133.7 g of m-phenylenediamine (m-PD), 80.3 g of p-phenylenediamine (p-PD), 18.8 g of phthalic anhydride, 150 ppm of sodium phenyl phosphinate and 2742 g of o-dichlorobenzene. The temperatures was raised to 132° C. and held at that temperature for 1 hour. A charge of 42.0 g of pyromellitic dianhydride was added slowly and the temperature was then raised to 170° C. and held there for 1 hour. The low polymer solution was transferred to a helicone for devolatilization at 290° C. and 22 mm Hg for 2 hours. The resulting polymer had an intrinsic viscosity of 0.67 dl/g in 60:40 phenol:tetrachloroethane a melt index of 0.67 (371° C.), a Tg of 232° C. and a heat distortion temperature (HDT) of 212° C. The material showed no cracking or crazing after 336 hours in 1,1,1-trichloroethane at 4000 psi in a stress jig or in transformer oil (120° C.) at 3200 psi.

EXAMPLE 8

To a 5 liter, jacketed (heating mantle) vessel were charged 900.0 g of 2,2-bis[4-(3,4-dicarboxyphenoxy)phenyl]propane dianhydride (BPA-DA), 107.0 g of m-phenylenediamine (m-PD), 107.0 g of p-phenylenediamine (p-PD), 18.8 g of phthalic anhydride, 150 ppm of sodium phenyl phosphinate and 2742 g of o-dichlorobenzene. The temperature was raised to 130° C. and held at that temperature for 1 hour. A charge of 42.0 g of pyromellitic dianhydride was added slowly and the temperature was then raised to 170° C. and held there for 1 hour. The low polymer solution was transferred to a helicone for devolatilization at 290° C. and 22 mm Hg for 2 hours. The resulting polymer had an intrinsic viscosity of 0.70 dl/g in 60:40 phenol:tetrachlorethane, a melt index of 0.70 (371° C.), a Tg of 234° C. and a HDT of 213° C. The material showed no cracking or crazing after 336 hours in 1,1,1-trichloroethane at 4000 psi in a stress jig or in transformer oil (120° C.) at 3200 psi.

EXAMPLE 9

To a 1 liter, jacketed (heating mantle) vessel were charged 200.0 g of 2,2-bis[4-(3,4-dicarboxyphenoxy)phenyl]propane dianhydride (BPA-DA), 9.5 g of m-phenylenediamine (m-PD), 38.0 g of p-phenylenediamine (p-PD), 3.9 g of phthalic anhydride, 250 ppm of sodium phenyl phosphinate and 670 g of o-dichlorobenzene. The temperature was raised to 130° C. and held at that temperature for 1 hour. A charge of 9.3 g of pyromellitic dianhydride was added slowly and the temperature was then raised to 160° C. and held there for 1 hour. A sample of the material was devolatilized at 350° C. and 25 mm Hg for two hours. The resulting polymer was insoluble in both chloroform and 60:40 phenol:tetrachloroethane. The material had a Tg of 235° C.

EXAMPLE 10

To demonstrate the superior properites of the present invention the following copolymers were prepared essentially according to the procedures of examples 1-9.

| Copolymer | Mole % Total Diamine As m-PD | Mole % Total Diamine As p-PD | Mole % Total Dianhydride As BPA-DA | Mole % Total Dianhydride As PMDA |
| --- | --- | --- | --- | --- |
| A | 62.5 | 37.5 | 90.0 | 10.0 |
| B | 62.5 | 37.5 | 85.0 | 15.0 |
| C | 50.0 | 50.0 | 90.0 | 10.0 |
| D | 50.0 | 50.0 | 100.0 | 0 |
| E | 100.0 | 0 | 82.0 | 12.0 |
| F | 100.0 | 0 | 100.0 | 0 |

Tetrapolymers A, B and C represent polymers prepared in accordance with the present invention and the terpolymers and copolymers, D, E and F, were used as controls.

Polymers A-F were tested for their chemical resistance in various solvents in a test referred to as Environmental Stress Crack Resistance (ESCR). The test involves flexing a molded test bar (254 mm × 127 mm × 31.75 mm) in a stress jig to a given pressure in the presence of a solvent. Failure is defined as crazing or cracking. Time is measured to failure or 336 hours.

Table I below lists the results of the ESCR tests for samples A-F.

TABLE I

| Solvent | Stress Level (psi) | A | B | C | D | E | F |
| --- | --- | --- | --- | --- | --- | --- | --- |
|  |  | (Time to Failure (Hrs)) | | | | | |
| 1,1,1-Tri- | 5000 | 3 | 168 | 3 | 6 | 7 | <1 |
| chloroethane | 4000 | NC* | NC | NC | 6 | 7 | <1 |
|  | 3200 | NC | NC | NC | NC | 24 | <1 |
| Transformer | 5000 | <1 | <1 | 7 | 2 | 7 | 1 |
| Oil (120° C.) | 4000 | 48 | 216 | 24 | 2 | 20 | 1 |
|  | 3200 | NC | NC | NC | NC | 60 | 2 |
| Methyl ethyl | 2400 | 8 | 8 | 6 | 3 | <1 | <1 |
| ketone | 1800 | 10 | 10 | 8 | 24 | 4 | <1 |
|  | 1200 | NC | NC | NC | NC | NC | <1 |

*"NC" indicates no crazing or cracking after 336 hours.

The above table demonstrates the superior chemical stability under stress of the tetrapolymers of the present invention (polymers A-C) versus the controls (polymers D-F).

The above examples evidence the superior properties of the resins of the present invention. Resin made from BPA-DA and m-PD with phthalic anhydride (PA) chain stopper (See polyetherimide F of Example 10) has a heat distortion temperature of 200° C., a Tg of 217° C. and a relatively poor chemical resistance. Resin made with 12 mole % of BPA-DA replaced by pyromellitic dianhydride (PMDA) (See polyetherimide E of Example 10) has significantly higher heat properties (HDT 216° C. and Tg 233° C.) but still unacceptable chemical resistance. Substituting about 37 to about 50% of the m-phenylene diamine with p-phenylene diamine and about 10 to 15 mole % of the BPA-DA with PMDA (See Polymers A—C of Example 10) produces a resin having good thermal properties and superior chemical resistance.

The terpolymer resins of one dianhydride and two diamines or two dianhydrides and one diamine seem to have either good chemical resistances or good heat properties. However, the tetrapolymer containing two dianhydrides and two diamines have properties superior to each individual terpolymer.

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to work-loading at elevated temperatures for long periods of time. Films formed from the polymeric compositions of this invention may be used in application where such films have been used previously. Thus, the compositions of the present invention can be used in automobile and aviation applications for decorative and protective purposes, and for containers and container linings, in laminating structures where films of the present compositions or where solutions of the claimed compositins of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides polytetrafluoro-ethylene, etc. The use of the curable compositions of the present invention as overcoats on other types of insulation is not precluded.

Applications which recommended these resins include their use as binders for asbestos fibers, carbon fibers, and other fibrous materials in making brake linings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended.

While the present invention has been described with reference to particular embodiments thereof, it will be understood that numerous modifications may be made by those skilled in the art without actually departing from the spirit and scope of the invention as defined in the appended claims.

I claim:

1. A polyetherimide copolymer which comprises repeating polyimide units of the formula

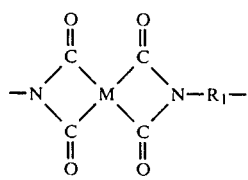

and repeating polyetherimide units of the formula

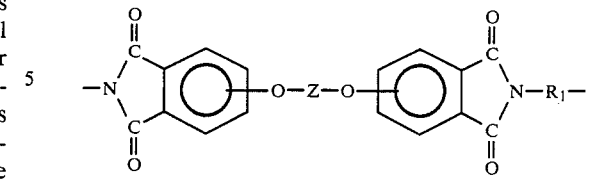

wherein $R_1$ is selected from the group represented by the following formulas:

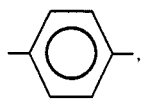

I

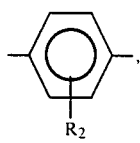

II

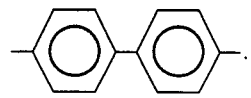

III

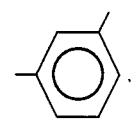

IV

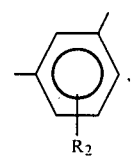

V

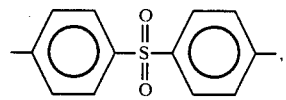

VI

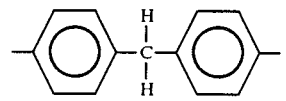

VII where $R_2$ is an alkyl radical of from 1 to 4 carbon atoms, provided that from about 1% to about 90% of the groups in the copolymer represented by $R_1$ are selected from formulas I–III and from about 99% to about 1% of those groups are selected from the formulas IV–VII; M is selected from the group consisting of

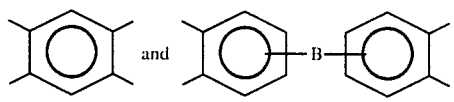

wherein B is —S— or

—O—Z—O—may be in the 3 or 3'- and 4 or 4'-positions and Z is a member of the class consisting of (1)

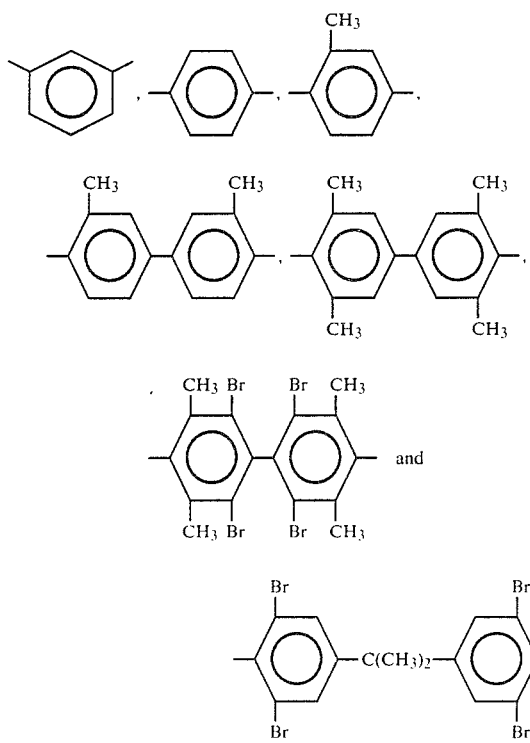

and (2) divalent organic radicals of the general formula:

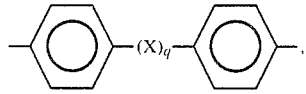

where X is a member selected from the class consisting of divalent radicals of the formulas, $-C_yH_{2y}-$,

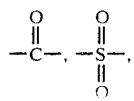

—O— and —S—, where q is 0 or 1, y is a whole number from 1 to 5, and wherein the copolymer contains from about 10 to about 10,000 of the polyimide and polyetherimide repeating groups.

2. The polyetherimide copolymer of claim 1, wherein the copolymer contains from about 25 mole % to about 99 mole % of the polyetherimide repeating units.

3. The polyetherimide copolymer of claim 1, wherein the copolymer contains from about 50 mole % to about 99 mole % of the polyetherimide repeating units and from about 25% to about 75% of the total groups represented by $R_1$ are m-phenylene.

4. The polyetherimide copolymer of claim 3, wherein the copolymer contains from about 75 mole % to about 99 mole % of the polyetherimide repeating units.

5. The polyetherimide copolymer of claim 1, 2, 3 or 4 wherein the polyimide repeating units are of the formula

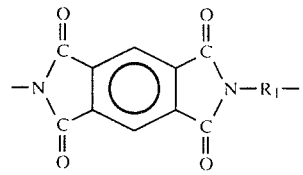

6. The polyetherimide of claim 5, wherein the polyetherimide repeating units are of the formula

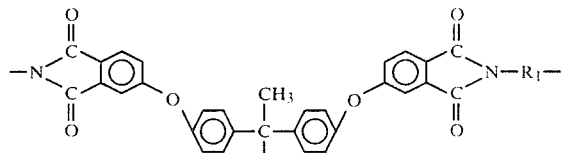

* * * * *

UNITED STATES PATENT AND TRADEMARK OFFICE
CERTIFICATE OF CORRECTION

PATENT NO. : 4,550,156
DATED : October 29, 1985
INVENTOR(S) : Gallagher

It is certified that error appears in the above-identified patent and that said Letters Patent is hereby corrected as shown below:

Column 9, line 15, "compositins" should be "compositions"

Column 10, line 56, claim 1, "90%" should be "99%"

Signed and Sealed this

Sixth Day of May 1986

[SEAL]

Attest:

DONALD J. QUIGG

Attesting Officer

Commissioner of Patents and Trademarks